United States Patent Office 3,290,394
Patented Dec. 6, 1966

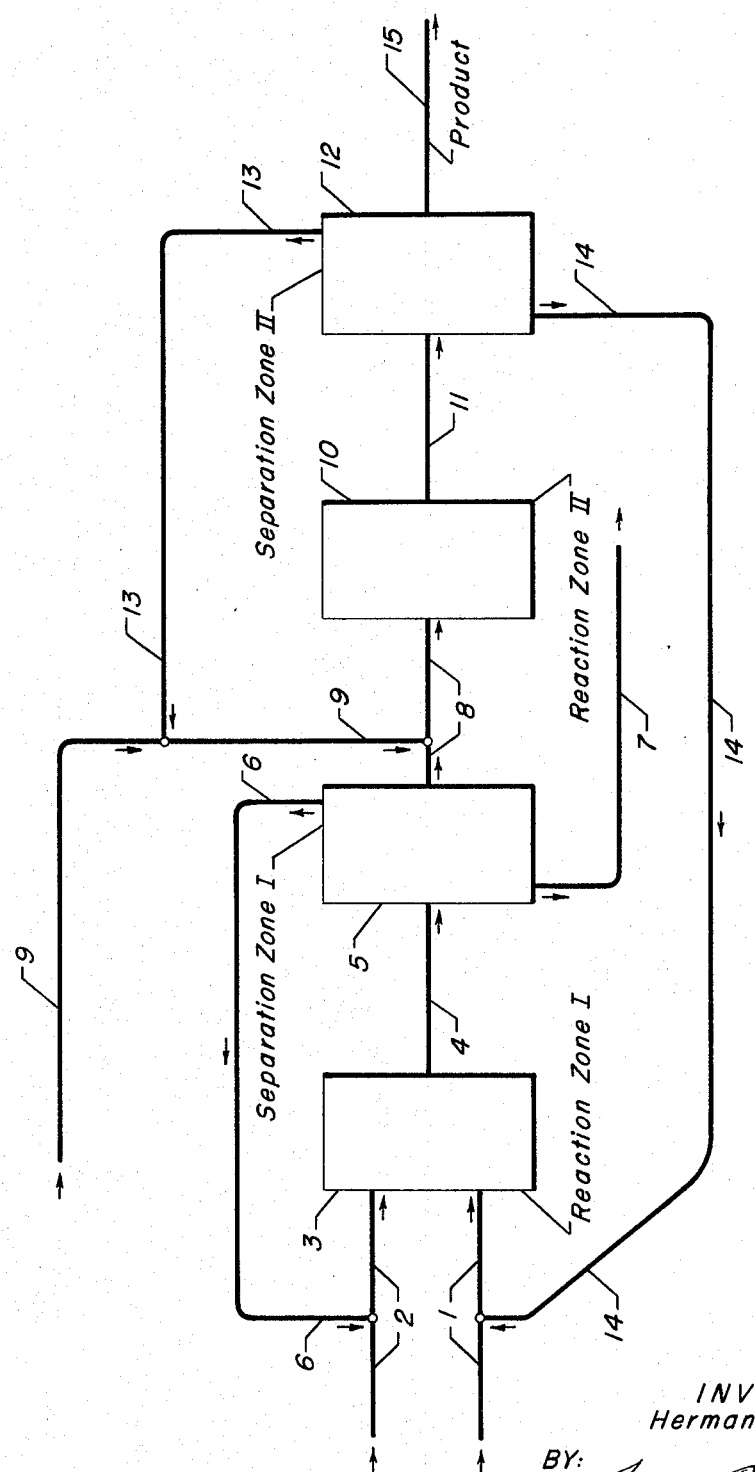
INVENTOR:
Herman S. Bloch

3,290,394
PRODUCTION OF ALKYLATED HYDROXY
SUBSTITUTED AROMATIC COMPOUNDS
Herman S. Bloch, Skokie, Ill., assignor to Universal Oil
Products Company, Des Plaines, Ill., a corporation of
Delaware
Filed Nov. 26, 1963, Ser. No. 326,129
13 Claims. (Cl. 260—624)

This application is a continuation-in-part of my copending application Serial No. 270,543, filed April 4, 1963.

This invention relates to a process for the production of an alkylated hydroxy substituted aromatic compound and more particularly relates to a novel combination process for the production of an alkylated hydroxy substituted aromatic hydrocarbon utilizing a novel method of preparing olefinic hydrocarbons from saturated hydrocarbons, said olefinic hydrocarbons being subsequently utilized as alkylating agents to produce certain straight chain alkylphenols, the oxyalkylated derivatives of which are desirable biodegradable detergents.

The preparation of olefin hydrocarbons by the thermal and/or catalytic dehydrogenation of saturated hydrocarbons is a highly endothermic process. Thus, in many cases, the required high temperatures lead to undesirable side reactions, poor product distribution and carbon formation.

It is therefore an object of this invention to present a novel combination process of the production of alkylated hydroxy substituted aromatic compounds and particularly for the production of alkylated hydroxy substituted aromatic hydrocarbons utilizing a novel method of preparing olefinic hydrocarbons from saturated hydrocarbons, said method being effected at comparatively moderate temperature conditions. A specific object of this invention is to provide an efficient and economical process for the production of octylphenol, a desired chemical intermediate in the production of biodegradable detergents.

Other objects of this invention will be set forth hereafter as part of the specification and in the accompanying examples.

One embodiment of the present invention relates to a process for the production of an alkylated hydroxy substituted compound which comprises passing to a first reaction zone a saturated hydrocarbon and a saturated polyhalohydrocarbon containing at least two halogen atoms attached to the same carbon atom, reacting said saturated hydrocarbons with said saturated polyhalohydrocarbon at a temperature of from about 200° C. to about 600° C., passing the effluent from said first reaction zone to a first separation zone, separating from the first separation zone unreacted saturated polyhalohydrocarbon, an olefin-containing hydrocarbon mixture and lower boiling reaction zone by-products, recycling said unreacted saturated polyhalohydrocarbon to the first reaction zone, withdrawing and passing to storage said lower boiling reaction zone by-products, passing said olefin-containing hydrocarbon mixture with alkylatable hydroxy substituted aromatic compound to a second reaction zone, alkylating at least a portion of said alkylatable hydroxy substituted aromatic compound with said olefin-containing hydrocarbon mixture in the presence of an acid-acting alkylation catalyst at a temperature of from about 0° to about 300° C. and a pressure of from about atmospheric to about 200 atmospheres, passing the second reaction zone effluent to a second separation zone, separating from the second separation zone unreacted hydroxy substituted aromatic compound, unreacted saturated hydrocarbon and desired alkylated hydroxy substituted aromatic compound, recycling at least a portion of said unreacted hydroxy substituted aromatic compound to the second reaction zone, recycling at least a portion of said unreacted saturated hydrocarbon to the first reaction zone, and removing desired alkylated hydroxy substituted aromatic compound as product from the process.

A further embodiment of the present invention relates to a process for the production of an alkylated hydroxy substituted aromatic hydrocarbon which comprises passing to a first reaction zone a saturated hydrocarbon and a saturated polyhalohydrocarbon containing at least two halogen atoms attached to the same carbon atom, reacting said saturated hydrocarbon with said saturated polyhalohydrocarbon at a temperature of from about 200° C. to about 600° C., passing the effluent from said first reaction zone to a first separation zone, separating from the first separation zone unreacted saturated polyhalohydrocarbon, an olefin-containing hydrocarbon mixture and lower boiling reaction zone by-products, recycling said unreacted saturated polyhalohydrocarbon to the first reaction zone, withdrawing and passing to storage said lower boiling reaction zone by-products, passing said olefin-containing hydrocarbon mixture in admixture with alkylatable hydroxy substituted benzene hydrocarbon to a second reaction zone, alkylating at least a portion of said alkylatable hydroxy substituted benzene hydrocarbon with said olefin-containing hydrocarbon mixture in the presence of an acid-acting alkylating catalyst at a temperature of from about 0° to about 300° C. and at a pressure of from about atmospheric to about 200 atmospheres, passing the second reaction zone effluent to a second separation zone, separating from the second separation zone unreacted hydroxy substituted benzene hydrocarbon, unreacted saturated hydrocarbon and desired alkylated hydroxy substituted benzene hydrocarbon, recycling at least a portion of said unreacted hydroxy substituted benzene hydrocarbon to the second reaction zone, recycling at least a portion of said unreacted saturated hydrocarbon to the first reaction zone, and removing desired alkylated hydroxy substituted benzene hydrocarbon as product from the process.

A specific embodiment of the present invention relates to a process for the production of octylphenol which comprises passing to a first reaction zone n-octane and carbon tetrachloride, reacting said n-octane with said carbon tetrachloride at a temperature of from about 200° C. to about 600° C., passing the effluent from said first reaction zone to a first separation zone, separating from the first separation zone unreacted carbon tetrachloride, a n-octene-containing hydrocarbon mixture and lower boiling reaction zone by-products, recycling said unreacted carbon tetrachloride to the first reaction zone, withdrawing and passing to storage said lower boiling reaction zone by-products, passing said n-octene-containing hydrocarbon mixture in admixture with phenol to a second reaction zone, alkylating at least a portion of said phenol with said n-octene-containing hydrocarbon mixture in the presence of an acid-acting alkylation catalyst at a temperature of from about 0° to about 300° C. and a pressure of from about atmospheric to about 200 atmospheres, passing the second reaction zone effluent to a second separation zone, separating from the second separation zone unreacted phenol, unreacted n-octane and desired octylphenol, recycling at least a portion of said unreacted phenol to the second reaction zone, recycling at least a portion of said unreacted n-octane to the first reaction zone, and removing desired octylphenol as product from the process.

Other embodiments of the present invention will become apparent in considering the specifications as hereinafter set forth.

This invention can be most clearly described and illustrated with reference to the attached drawing. While of necessity, certain limitations must be present in such a schematic description, no intention is meant thereby to limit the generally broad scope of this invention. As stated hereinabove, the first step of the process of the present invention comprises reacting a saturated hydrocarbon with a saturated polyhalohydrocarbon in a first reaction zone. In the drawing, this first step is represented as taking place in reactor 3, labeled reaction zone I. However, the saturated hydrocarbon and saturated polyhalohydrocarbon containing at least two halogen atoms attached to the same carbon atom must be furnished to this reaction zone. In the drawing, the saturated hydrocarbon is represented as being furnished to reactor 3 through line 1. The saturated polyhalohydrocarbon containing at least two halogen atoms attached to the same carbon atom is represented as being furnished to reactor 3, via line 2.

Saturated hydrocarbons utilized in accordance with the process of this invention may contain up to about 20 carbon atoms or more. The saturated hydrocarbons, which can be aliphatic or cyclic, should contain at least one hydrogen atom attached to each of two adjacent carbon atoms. At the conditions herein described, the saturated hydrocarbon starting material is converted principally to monoolefinic hydrocarbons which are of the same carbon configuration as the starting material. Thus, heptane is converted to a mixture of heptenes, isobutane is converted to isobutene, and cyclohexane is converted to cyclohexene. Although ethane is operable as a saturated hydrocarbon, its rate of reaction is substantially less than that of its higher homologs and the saturated hydrocarbons preferably contain more than two carbon atoms. Saturated hydrocarbons which can be utilized thus include cyclopentane, methylcyclopentane, cyclohexane, methylcyclohexane, and the like and also propane, butane, isobutane, pentane, isopentane, hexane, etc., and higher homologs and structural isomers thereof containing up to about 20 carbon atoms or more, for example, such as heptane, octane, decane, dodecane, pentadecane, eicosane, and the like.

The saturated polyhalohydrocarbon containing at least two halogen atoms attached to the same hydrocarbon, as set forth hereinabove, is passed to reactor 3 via line 2. Suitable saturated polyhalohydrocarbons thus include polychloro derivatives of saturated hydrocarbons, for example, methylene chloride, chloroform, carbon tetrachloride, 1,1-dichloroethane, 1,1,1-trichloroethane, 1,1,2-trichloroethane, 1,1,1,2-tetrachloroethane, 1,1,2,2-tetrachloroethane, pentachloroethane, hexachloroethane, 1,1,-dichloropropane, 2,2,-dichloropropane, etc., and also polychloroderivatives of cyclic saturated hydrocarbons such as 1,1-dichlorocyclohexane, 1,1,-dichlorocyclopentane, and the like. Of the above-mentioned types, the substituted methanes are preferred, since they undergo minimal side reactions. The corresponding bromo, fluoro, and iodo derivatives of saturated hydrocarbons are also operable, although the chloro derivatives are preferred because of greater economy of operation. Saturated polyhalohydrocarbons comprising different halogen atoms as in the case of trifluorochloromethane, dichlorodifluoromethane, trichlorofluoromethane, dichlorofluoromethane, difluorochloromethane, trichlorobromomethane, dichlorodibromomethane, difluorochlorobromomethane, 1,1-dichloro-1,2,2,2-tetrafluoroethane, 1,1,1,2-tetrachloro-2,2-difluoroethane, 1,1,1-trichloro-2,2,2-trifluoroethane, 1-chloro-1,1,2,2,2-pentafluoroethane, and the like, are also operable and within the scope of this invention.

As set forth hereinabove, the saturated hydrocarbon and a saturated polyhalohydrocarbon containing at least two halogen atoms attached to the same carbon atom are reacted in reactor 3. Reaction conditions in reactor 3 relate principally to temperature. Pressure does not appear to be an important variable with respect to the method of this portion of the process and may be atmospheric, or the autogenous pressure developed during the course of the reaction, or it may be an imposed pressure to facilitate a process flow. In general, heating a saturated hydrocarbon in contact with a saturated polyhalohydrocarbon at a temperature of from about 200° C. to about 600° C. will effect the conversion of said saturated hydrocarbon primarily to a monoolefinic hydrocarbon. Formation of polyunsaturated by-products, such as diolefins and aromatics, is favored by more severe reaction conditions including extended contact times, temperatures in the range and in excess of about 600° C., and also high ratios of halohydrocarbon to hydrocarbon in the mixture. It is preferred to utilize a temperature of from about 300° C. to about 500° C., the optimum temperature in any particular case being in part dependent upon the hydrocarbon being treated and the halohydrocarbon employed, and in part upon the contact time of the reactants. It is contemplated within the scope of this invention that the saturated hydrocarbon is charged to the first reaction zone in at least an equimolar amount with the polyhalohydrocarbon. The reactants may be combined and charged to the reactor in a single stream or introduced thereto in individual streams as represented schematically in the drawing. The reaction zone is preferably of the adiabatic type and thus feed to the reaction zone will preferably be provided with the requisite amount of heat prior to passage thereof to said reaction zone. The reactor can be an unpacked vessel or coil may contain an inert packing, baffles, trays, etc. The reactor effluent is withdrawn at a rate which will insure an adequate residence time therein. A residence time of from about 0.005 minute or less to about 5 hours or more is suitable, and a residence time of from about 0.5 minute to about 5 hours is especially preferred, the more extended periods being utilized in the case of a once-through operation and/or the lower temperatures in the range described. The reactor effluent is then withdrawn via line 4 and passed to separation zone 5, labeled separation zone I.

In separation zone I unreacted saturated polyhalohydrocarbon, an olefin-containing hydrocarbon mixture and lower boiling reaction zone byproducts are separated. The unreacted saturated polyhalohydrocarbon is recycled to reaction zone I via lines 6 and 2. Lower boiling reaction zone by-products are withdrawn and passed to storage via line 7 for subsequent treatment and recombination. The olefin-containing hydrocarbon mixture is passed from separation zone I via line 8 in admixture with alkylatable hydroxy substituted aromatic compound from line 9 to second reactor 10.

Many hydroxy substituted aromatic compounds are utilizable as alkylatable hydroxy substituted aromatic compounds within the process of this invention. Suitable hydroxy substituted aromatic compounds include both mono- and polyhydric phenols such as phenol, hydroquinone, resorcinol, catechol, phloroglucinol, o-cresol, m-cresol, p-cresol, o-ethylphenol, m-ethylphenol, p-ethylphenol, the isomeric propyl, butyl, pentyl, hexyl, heptyl, octyl, nonyl, decyl, undecylphenols, etc.; cycloalkylphenols such as p-cyclohexylphenol; alkyl and cycloalkyl ethers of the polyhydric phenols in which the compound contains at least one free hydroxy group such as o-methoxyphenol, m-methoxyphenol, p-methoxyphenol, o-ethoxyphenol, m-ethoxyphenol, p-ethoxyphenol, o-propoxyphenol, m-propoxyphenol, p-propoxyphenol, o-butoxyphenol, m-butoxyphenol, p-butoxyphenol, 2,6-dimethoxyphenol, 2,3-dimethoxyphenol, 2,4-dimethoxyphenol, 2,3-diethoxyphenol, 2,4-diethoxyphenol, 2,6-diethoxyphenol, o-cyclopentoxyphenol, m-cyclopentoxyphenol, p-cyclopentoxyphenol, o-cyclohexoxyphenol, m-cyclohexoxyphenol, p-cyclohexoxyphenol, o-cycloheptoxyphenol, m-cycloheptoxyphenol, p-cycloheptoxyphenol, etc.; nuclear substituted derivatives of phenol such as o-chlorophenol, m-chlorophenol, p-chlorophenol, o-bromophenol, m-bromophenol, p-bromophenol, o-iodophenol, m-iodophenol, p-iodophenol, o-nitrophenol, m-nitrophenol, p-nitrophenol, etc. In addition it is also contemplated within the scope of this invention that polynuclear and condensed ring aromatic compounds containing at least one hydroxy substituent may also be alkylated to form the desired products, such compounds including 4-hydroxybiphenyl,
    3-hydroxybiphenyl,
    2-hydroxybiphenyl,
    1-hydroxynaphthalene,
    2-hydroxynaphthalene,
    1-hydroxyanthracene,
    2-hydroxyanthracene,
    1-hydroxychrysene,
    2-hydroxychrysene,
    3-hydroxychrysene,
    1-hydroxypyrene,
    2-hydroxypyrene,
    4,4'-dihydroxybiphenyl,
    2,4'-dihydroxybiphenyl,
    2,2'-dihydroxybiphenyl,
    2,4-dihydroxybiphenyl,
    1,2-dihydroxynaphthalene,
    1,4-dihydroxynaphthalene,
    1,2-dihydroxyanthracene,
    1,2-dihydroxychrysene,
    1,2-dihydroxypyrene,
    1-hydroxy-2-methoxynaphthalene,
    1-hydroxy-2-ethoxynaphthalene,
    1-hydroxy-2-methoxyanthracene,
    1-hydroxy-2-methoxychrysene,
    1-hydroxy-2-methoxypyrene,
    1-hydroxy-2-chloronaphthalene,
    1-hydroxy-4-chloronaphthalene,
    1-hydroxy-2-chloroanthracene,
    1-hydroxy-2-chlorochrysene, etc.

As hereinabove set forth, an olefin-containing hydrocarbon mixture is passed in admixture with alkylatable hydroxy substituted aromatic compound to reaction zone II. Reaction zone II is of the conventional type with an acid-acting alkylation catalyst disposed therein in the reaction zone. The reaction zone may be equipped with heat transfer means, baffles, trays, heating means, etc. The reaction zone is preferably of the adiabatic type and thus feed to the reaction zone will preferably be provided with the requisite amount of heat prior to passage thereof to said reaction zone. The actual operation of the second reaction zone may be either upflow or downflow. As set forth hereinabove, the reaction zone is packed with an acid-acting alkylation catalyst.

Catalysts which may be used to effect the alkylation between the hydroxy substituted aromatic compound and the olefin-containing hydrocarbon mixture comprise acid-acting alkylation catalysts including acid-acting refractory inorganic oxide catalysts such as silica-alumina, alumina treated with hydrogen fluoride, alumina treated with hydrogen chloride, alumina treated with boron fluoride, etc. It is also contemplated within the scope of this invention that other refractory inorganic oxides may be utilized as acid-acting alkylation catalysts, although not necessarily with equivalent results. These substances include titanium dioxides, zirconium dioxides, chromia, zinc oxide, magnesia-alumina, silica-magnesia, silica-alumina-magnesia, silica-alumina-zirconia, chromia-alumina, alumina-boria, silica-zirconia, etc. These refractory inorganic oxides may be, but do not necessarily have to be, treated with an acid. If acid treatment is desired, it is necessary that the inorganic oxide utilized form a fairly stable compound with the acid from which the latter is not readily driven off by heat or reduced pressure. In addition, it is also contemplated within the scope of this invention that the acid-acting alkylation catalyst could comprise hydrofluoric acid, sulfuric acid, boron trifluoride, and mixtures thereof. Further, it is also contemplated within the scope of this invention that a Friedel-Crafts metal halide catalyst such as aluminum chloride, aluminum bromide, zirconium chloride, ferric chloride, zinc chloride, bismuth chloride, etc., may be disposed therein in the reaction zone as the acid-acting alkylation catalyst.

The conditions utilized in reaction zone II may be varied over a relatively wide range. Thus, the desired alkylation reaction in the presence of one of the above-indicated acid-acting alkylation catalysts may be effected at a temperature of from about 0° C. to about 300° C. or higher, depending of course upon the type of acid-acting alkylation catalyst chosen and depending on the particular feed stock charged to the alkylation zone. The alkylation reaction is usually carried out at a pressure of from about atmospheric, and preferably from about 1 atmosphere, to about 200 atmospheres or more. The pressure utilized is usually selected to maintain the alkylatable aromatic compound in substantially liquid phase. The hourly liquid space velocity of the liquid provided the alkylation zone may be varied over a relatively wide range of from about 0.1 to about 20 or more.

When the alkylation reaction has proceeded to the desired extent, preferably with 100% conversion of the olefin portion of the olefin-containing hydrocarbon mixture, the products from the second reaction zone, which may be termed alkylation zone effluent, pass from second reaction zone 10, herein labeled as reaction zone II via line 11 to second separation zone 12, herein labeled as separation zone II.

In separation zone II, unreacted hydroxy substituted aromatic compound, unreacted saturated hydrocarbon and desired alkylated hydroxy substituted aromatic compound are separated. At least a portion of the unreacted hydroxy substituted aromatic compound is recycled to the second reaction zone via lines 13 and 9 to admix with fresh alkylatable hydroxy substituted aromatic compound being provided to the process in line 9. Recycle unreacted alkylatable hydroxy substituted aromatic compound is available in the process since it is preferred to utilize a molar excess of alkylatable hydroxy substituted aromatic compound over olefin-containing hydrocarbon mixture. This, as disclosed in the prior art, has been found necessary to prevent side reactions from taking place, such as, for example, polymerization of the olefin-containing hydrocarbon mixture prior to reaction thereof with the alkylatable hydroxy substituted aromatic compound and to direct the reaction principally to monoalkylation. Any molar excess of alkylatable hydroxy substituted aromatic compound may be utilized, although best results are obtained when the alkylatable hydroxy substituted aromatic compound to olefin-containing hydrocarbon mixture molar ratio is from about 3:1 to about 10:1 or more.

In separation zone II, the unreacted saturated hydrocarbon is removed via line 14 and passed via lines 14 and 1 to reaction zone I, thus effecting economy of operation. As the final step in the process, the desired alkylated hydroxy substituted aromatic compound is removed as product from the process via line 15.

The following examples are introduced for the purpose of illustration only with no intention of unduly limiting the generally broad scope of the present invention.

*Example 1*

This example illustrates the process of the present invention utilizing n-octane as the saturated hydrocarbon feed stock and utilizing carbon tetrachloride as the saturated polyhalohydrocarbon containing at least two halogen atoms attached to the same carbon atom.

The carbon tetrachloride and n-octane are passed to a first reaction zone and reacted at a temperature of about 375° C. and a pressure of about 50 p.s.i.g. The first reaction zone effluent is passed to separation means comprising fractional distillation means and unreacted carbon tetrachloride, a n-octane-containing hydrocarbon mixture and lower boiling reaction zone by-products are separated. The unreacted carbon tetrachloride is recycled back to the first reaction zone and the lower boiling reaction zone by products are separated. The unreacted carbon tetrachloride is recycled back to the first reaction zone and the lower boiling reaction zone by-products are withdrawn from the first separation zone and passed to storage. These lower boiling reaction zone by-products consist essentially of chloroform and hydrogen chloride and these substances are subsequently treated and recombined to form the saturated polyhalohydrocarbon (carbon tetrachloride) utilized in the process.

The n-octene-containing hydrocarbon mixture comprises about 28% octenes, small amounts of dienes with the balance of the hydrocarbon mixture being the unreacted n-octane. This octene-containing hydrocarbon mixture is passed in admixture with alkylatable hydroxy substituted aromatic hydrocarbon, namely phenol, to a second reaction zone. In the second reaction zone, the phenol is alkylated with the octene-containing hydrocarbon mixture in the presence of substantially anhydrous hydrofluoric acid alkylation catalyst at a temperature of about 20° C., and a pressure of about 2 atmospheres. After the desired residence time has been completed the second reaction zone effluent is passed to a second separation zone wherein hydrogen fluoride, unreacted phenol, unreacted n-octane and desired octylphenol are separated by fractional distillation means. Analyses of the second reaction zone effluent show that essentially complete conversion of the octene portion of the octene-containing hydrocarbon mixture is obtained. The hydrogen fluoride and unreacted phenol are recycled to the second reaction zone in admixture with fresh phenol furnished to the process thereby practicing economy of operation. The n-octane is recycled to the first reaction zone to pass with the fresh n-octane to the first step of the process also effecting economy of operation. The desired octylphenol is removed as product from the process.

*Example II*

This example illustrates the process of the present invention utilizing n-octane as the saturated hydrocarbon feed stock and utilizing carbon tetrabromide as the saturated polyhalohydrocarbon containing at least two halogen atoms attached to the same carbon atom.

The carbon tetrabromide and n-octane are passed to a first reaction zone and reacted at a temperature of about 350° C. and a pressure of about 50 p.s.i.g. The first reaction zone effluent is passed to separation means comprising fractional distillation means and unreacted carbon tetrabromide, a n-octene-containing hydrocarbon mixture and lower boiling reaction zone by-products are separated. The unreacted carbon tetrabromide is recycled back to the first reaction zone and the lower boiling reaction zone by-products are withdrawn from the first separation zone and passed to storage. These lower boiling reaction zone by-products consist essentially of bromoform and hydrogen bromide and these are subsequently treated and recombined to form the saturated polyhalohydrocarbon (carbon tetrabromide) utilized in the first step of the process.

The n-octene-containing hydrocarbon mixture comprises about 25% n-octenes, small amounts of dienes with the balance of the hydrocarbon mixture being the unreacted n-octane. This octene-containing hydrocarbon mixture is passed in admixture with alkylatable hydroxy substituted aromatic hydrocarbon, namely phenol, to a second reaction zone.

In the second reaction zone, the phenol is alkylated with the octene-containing hydrocarbon mixture in the presence of a hydrogen fluoride treated silica-alumina alkylation catalyst at a temperature of from about 200° C. and a pressure of about 40 atmospheres. After the desired residence time has been completed, the second reaction zone effluent is passed to a second separation zone wherein unreacted phenol, unreacted n-octane and desired octylphenol are separated by fractional distillation means. It is again determined analytically that essentially complete conversion of the octene portion of the octene-containing hydrocarbon mixture is obtained since n-octenes are substantially absent from the same reaction zone effluent. The unreacted phenol is then recycled to the second reaction zone in admixture with fresh phenol thereby practicing economy of operation. The unreacted n-octane is recycled to the first reaction zone to pass with the fresh n-octane to the first step of the process thereby also effecting economy of operation. The desired octylphenol is removed as product from the process.

*Example III*

This example illustrates the process of the present invention utilizing n-hexane as the saturated hydrocarbon feed stock and utilizing carbon tetrachloride as the saturated polyhalohydrocarbon containing at least two halogen atoms attached to the same carbon atom.

The carbon tetrachloride and hexane are passed to a first reaction zone and reacted at a temperature of about 400° C. and a pressure of about 50 p.s.i.g. The first reaction zone effluent is passed to separation means comprising fractional distillation means and unreacted carbon tetrachloride, a n-hexene-containing hydrocarbon mixture and lower boiling reaction zone by-products are separated. The unreacted carbon tetrachloride is recycled back to the first reaction zone and the lower boiling reaction zone by-products (mainly chloroform and hydrogen chloride) are withdrawn from the first separation zone and passed to storage where they are subsequently treated and recombined to form the saturated polyhalohydrocarbon utilized in the process.

The n-hexene-containing hydrocarbon mixture comprises about 23% n-hexenes, small amounts of dienes with the balance of the hydrocarbon mixture being the unreacted n-hexane. This hexene-containing hydrocarbon mixture is passed in admixture with alkylatable hydroxy substituted aromatic hydrocarbon, namely phenol, to the second reaction zone.

In the second reaction zone, the phenol is alkylated with the hexene-containing hydrocarbon mixture in the presence of a substantially anhydrous hydrofluoric acid alkylation catalyst at a temperature of about 25° C. and a pressure of about 3 atmospheres. After the desired residence time has been completed, the second reaction zone effluent is passed to a second separation zone wherein unreacted phenol, unreacted n-hexane and desired hexylphenol are separated by fractional distillation means. Analyses of the second reaction zone effluent show that essentially complete conversion of the hexene portion of the hexene-containing hydrocarbon mixture is obtained. The unreacted phenol is recycled to the second reaction zone in admixture with fresh phenol and the unreacted n-hexane is recycled to the first reaction zone to pass with the fresh n-hexane to the first step of the process thereby effecting economy of operation. The desired hexylphenol is removed as product from the process.

I claim as my invention:

1. A process for the production of an alkylated hydroxy substituted aromatic compound which comprises passing to a first reaction zone a saturated hydrocarbon and a saturated polyhalohydrocarbon containing at least two halogen atoms attached to the same carbon atom, reacting said saturated hydrocarbon with said saturated polyhalohydrocarbon at a temperature of from about 200° C. to about 600° C., passing the effluent from said first reaction zone to a first separation zone, separating from the first separation zone unreacted saturated polyhalohydrocarbon, an olefin-containing hydrocarbon mixture and lower boiling reaction zone by-products, recycling said unreacted saturated polyhalohydrocarbon to the first reaction zone, withdrawing and passing to storage said lower boiling reaction zone by-products, passing said olefin-containing hydrocarbon mixture in admixture with alkylatable hydroxy substituted aromatic compound to a second reaction zone, alkylating at least a portion of said alkylatable hydroxy substituted aromatic compound with said olefin-containing hydrocarbon mixture in the presence of an acid-acting alkylation catalyst at a temperature of from about 0° to about 300° C. and a pressure of from about atmospheric to about 200 atmospheres, passing the second reaction zone effluent to a second separation zone, separating from the second separation zone unreacted hydroxy substituted aromatic compound, unreacted saturated hydrocarbon and desired alkylated hydroxy substituted aromatic compound, recycling at least a portion of said unreacted hydroxy substituted aromatic compound to the second reaction zone, recycling at least a portion of said unreacted saturated hydrocarbon to the first reaction zone, and removing desired alkylated hydroxy substituted aromatic compound as product from the process.

2. The process of claim 1 further characterized in that said saturated hydrocarbon is a saturated aliphatic hydrocarbon.

3. The process of claim 1 further characterized in that said saturated hydrocarbon is a saturated cyclic hydrocarbon.

4. A process for the production of an alkylated hydroxy substituted aromatic hydrocarbon which comprises passing to a first reaction zone a saturated hydrocarbon and a saturated polyhalohydrocarbon containing at least two halogen atoms attached to the same carbon atoms, reacting said saturated hydrocarbon with said saturated polyhalohydrocarbon at a temperature of from about 200° C. to about 600° C., passing the effluent from said first reaction zone to a first separation zone, separating from the first separation zone unreacted saturated polyhalohydrocarbon, an olefin-containing hydrocarbon mixture and lower boiling reaction zone by-products, recycling said unreacted saturated polyhalohydrocarbon to the first reaction zone, withdrawing and passing to storage said lower boiling reaction zone by-products, passing said olefin-containing hydrocarbon mixture in admixture with alkylatable hydroxy substituted aromatic hydrocarbon to a second reaction zone, alkylating at least a portion of said alkylatable hydroxy substituted aromatic hydrocarbon with said olefin-containing hydrocarbon mixture in the presence of an acid-acting alkylation catalyst at a temperature of from about 0° C. to about 300° C. and at a pressure of from about atmospheric to about 200 atmospheres, passing the second reaction zone effluent to a second separation zone, separating from the second separation zone unreacted hydroxy substituted aromatic hydrocarbon, unreacted saturated hydrocarbon and desired alkylated hydroxy substituted aromatic hydrocarbon, recycling at least a portion of said unreacted hydroxy aromatic substituted hydrocarbon to the second reaction zone, recycling at least a portion of said unreacted saturated hydrocarbon to the first reaction zone, and removing desired alkylated hydroxy substituted aromatic hydrocarbon as product from the process.

5. The process of claim 4 further characterized in that said alkylatable hydroxy substituted aromatic hydrocarbon is an alkylatable hydroxy substituted benzene hydrocarbon.

6. The process of claim 5 further characterized in that said saturated polyhalohydrocarbon containing at least two halogen atoms attached to the same carbon atom is a saturated polychlorohydrocarbon containing at least two chlorine atoms attached to the same carbon atom.

7. The process of claim 5 further characterized in that said saturated polyhalohydrocarbon containing at least two halogen atoms attached to the same carbon atom is a saturated polybromohydrocarbon containing at least two bromine atoms attached to the same carbon atom.

8. The process of claim 6 further characterized in that said saturated polychlorohydrocarbon containing at least two chlorine atoms attached to the same carbon atom is carbon tetrachloride.

9. The process of claim 7 further characterized in that said saturated polybromohydrocarbon containing at least two bromine atoms attached to the same carbon atom is carbon tetrabromide.

10. A process for the production of octylphenol which comprises passing to a first reaction zone n-octane and carbon tetrachloride, reacting said n-octane with said carbon tetrachloride at a temperature of from about 200° C. to about 600° C., passing the effluent from said first reaction zone to a first separation zone, separating from the first separation zone unreacted carbon tetrachloride, a n-octene-containing hydrocarbon mixture and lower boiling reaction zone by-products, recycling said unreacted carbon tetrachloride to the first reaction zone, withdrawing and passing to storage said lower boiling reaction zone by-products, passing said n-octene-containing-hydrocarbon mixture in admixture with phenol to a second reaction zone, alkylating at least a portion of said phenol with said n-octene-containing hydrocarbon mixture in the presence of an acid-acting alkylation catalyst at a temperature of from about 0° C. to about 300° C. and a pressure of from about atmospheric to about 200 atmospheres, passing the second reaction zone effluent to a second separation zone, separating from the second separation zone unreacted phenol, unreacted n-octene and desired octylphenol, recycling at least a portion of said unreacted phenol to the second reaction zone, recycling at least a portion of said unreacted n-octane to the first reaction zone, and removing desired octylphenol as product from the process.

11. A process for the production of octylphenol which comprises passing to a first reaction zone n-octane and carbon tetrabromide, reacting said n-octane with said carbon tetrabromide at a temperature of from about 200° C. to about 600° C., passing the effluent from said first reaction zone to a first separation zone, separating from the first separation zone unreacted carbon tetrabromide, a n-octene-containing hydrocarbon mixture and lower boiling reaction zone by-products, recycling said unreacted carbon tetrabromide to the first reaction zone, withdrawing and passing to storage said lower boiling reaction zone by-products, passing said n-octene-containing hydrocarbon mixture in admixture with phenol to a second reaction zone, alkylating at least a portion of said phenol with said n-octene-containing hydrocarbon mixture in the presence of an acid-acting alkylation catalyst at a temperature of from about 0° C. to about 300° C. and a pressure of from about atmospheric to about 200 atmospheres, passing the second reaction zone effluent to a second separation zone, separating from the second separation zone unreacted phenol, unreacted n-octane and desired octylphenol, recycling at least a portion of said unreacted phenol to the second reaction zone, recycling at least a portion of said unreacted n-octane to the first reaction zone, and removing desired octylphenol as product from the process.

12. A process for the production of octylphenol which comprises passing to a first reaction zone n-octane and trifluorobromomethane, reacting said n-octane with said trifluorobromomethane at a temperature of from about 200° C. to about 600° C., passing the effluent from said first reaction zone to a first separation zone, separating from said first separation zone unreacted trifluorobromomethane, a n-octene-containing hydrocarbon mixture and lower boiling reaction zone by-products, recycling said unreacted trifluorobromomethane to the first reaction zone, withdrawing and passing to storage said lower boiling reaction zone by-products, passing n-octene-containing hydrocarbon mixture in admixture with phenol to a second reaction zone, alkylating at least a portion of said phenol with said n-octene-containing hydrocarbon mixture in the presence of an acid-acting alkylation catalyst at a temperature of from about 0° C. to about 300° C. and a pressure of from about atmospheric to about 200 atmospheres, passing the second reaction zone effluent to a second separation zone, separating from the second separation zone unreacted phenol, unreacted n-octane, and desired octylphenol, recycling at least a portion of said unreacted phenol to the second reaction zone, recycling at least a portion of said unreacted n-octane to the first reaction zone, and removing desired octylphenol as product from the process.

13. A process for the production of hexylphenol which comprises passing to a first reaction zone n-hexane and carbon tetrachloride, reacting said n-hexane with said carbon tetrachloride at a temperature of 200° C. to about 600° C., passing the effluent from said first reaction zone to a first separation zone, separating from the first separation zone unreacted carbon tetrachloride, a n-hexane-containing hydrocarbon mixture and lower boiling reaction zone by-products, recycling said unreacted carbon tetrachloride to the first reaction zone, withdrawing and passing to storage said lower boiling reaction zone by-products, passing said n-hexene-containing hydrocarbon mixture in admixture with phenol to a second reaction zone, alkylating at least a portion of said phenol with said n-hexene-containing hydrocarbon mixture in the presence of an acid-acting alkylation catalyst at a temperature of from about 0° C. to about 300° C. and a pressure of from about atmospheric to about 200 atmospheres, passing the second reaction zone effluent to a second separation zone, separating from the second separation zone unreacted phenol, unreacted n-hexane and desired hexylphenol, recycling at least a portion of said unreacted phenol to the second reaction zone, recycling at least a portion of said unreacted n-hexane to the first reaction zone, and removing desired hexylphenol as product from the process.

No references cited.

LEON ZITVER, *Primary Examiner.*

W. B. LONE, *Assistant Examiner.*